United States Patent [19]

Garcia Puig et al.

[11] Patent Number: 5,674,818
[45] Date of Patent: Oct. 7, 1997

[54] COMPOSITION FOR COATING RUBBER OR LATEX ARTICLES

[75] Inventors: Eduard Garcia Puig; Josep Saltor Bosch, both of Barcelona; Josep Clotas Figueras, Girona, all of Spain

[73] Assignee: Productes Del Latex, S.A., Llado, Spain

[21] Appl. No.: 549,525

[22] Filed: Oct. 27, 1995

[30] Foreign Application Priority Data

Oct. 28, 1994 [ES] Spain ................... 9402237

[51] Int. Cl.$^6$ ................... C10M 107/50
[52] U.S. Cl. ................... 508/208; 508/209; 106/38.25
[58] Field of Search ................... 252/49.3, 49.5; 106/38.25; 508/209, 208

[56] References Cited

U.S. PATENT DOCUMENTS

| | | |
|---|---|---|
| 3,411,982 | 11/1968 | Kavalir et al. |
| 3,967,014 | 6/1976 | Esemplare et al. |
| 3,992,221 | 11/1976 | Homsy et al. |
| 4,482,577 | 11/1984 | Goldstein et al. |
| 4,575,476 | 3/1986 | Podell et al. |
| 4,597,108 | 7/1986 | Momose. |
| 4,840,742 | 6/1989 | Hoffman ................... 252/49.5 |
| 5,431,832 | 7/1995 | Crowe et al. ................... 252/49.5 |
| 5,464,586 | 11/1995 | Wagner ................... 252/49.6 |

*Primary Examiner*—Jacqueline V. Howard
*Attorney, Agent, or Firm*—Cushman, Darby & Cushman IP Group of Pillsbury Madison & Sutro LLP

[57] ABSTRACT

The present invention relates to a novel composition for coating articles of rubber or latex which is based on polar polyethylenic waxes, polymers derived from dimethylsiloxane and surfactants, and the purpose of which is to prevent adhesion between the surfaces of the coated material and to increase sliding on the coated material. The application of this product does not require previous treatment of the rubber or latex article and can be carried out in the production chain itself before the article is vulcanized. The invention has a potential use in the manufacture of surgical gloves because it facilitates the fitting thereof.

12 Claims, No Drawings

5,674,818

COMPOSITION FOR COATING RUBBER OR LATEX ARTICLES

BACKGROUND OF THE INVENTION

1. Field of the Invention

The present invention relates to novel compositions, based on polyethylenic waxes and polymers derived from dimethylsiloxane, for coating, with a lubricating layer, flexible rubber articles, and in particular fine-film latex gloves which are used in medical and medico-surgical operation. The present invention also related to a process for applying said compositions to the rubber articles.

2. Description of the Related Art

There is a need at present for novel products or processes which prevent the adhesion of latex films to one another and facilitate the fitting of surgical gloves onto the user's hands, for which reason the gloves have to be treated beforehand with a lubricant. The conventional procedure for manufacturing surgical gloves consists basically in a continuous process in which a series of molds are transported in a chain in order to effect various phases in succession. The phases of the mentioned process are:

a) Application of a solution for coagulating the latex, normally a soluble calcium salt, which may also incorporate a product for facilitating removal from the mold.

b) Application of a dispersion latex which has previously been treated in order to obtain the physical properties of interest, and formation of the latex film.

c) Partial drying of the latex film.

d) Extraction of soluble materials from the latex film by washing in hot water.

e) Drying and vulcanization of the latex film.

f) Application of the lubricating powder.

g) Removal of the glove from the mold (de-molding).

The lubricant used in the majority of cases is a pulverulent product which comprises corn starch which has been rendered inert and is applied to the inner surface of the glove, although it is also possible to use other starches which have been rendered inert. However, the use of these powder-form products as lubricants in surgical gloves has the disadvantage of increasing the risk of contaminating the operating area, and the possibility of causing adverse post-operational reactions.

Hitherto, attempts have been made to solve the problem of using lubricating powders by the surface treatment of the inner and/or outer part of the latex film with various products.

To begin with, an attempt was made to prevent adhesion between the layers of latex by carrying out the halogenation of the latex film by means of bromine or, more generally, chlorine. Patents U.S. Pat. No. 3,992,221, U.S. Pat. No. 4,597,108 and EP 356 580, inter alia, describe some of the halogenation processes used. These techniques have major disadvantages. On the one hand, halogenation is a drastic process which may impair the physical properties of the glove, especially its resilience, which is why the halogenation conditions have to be controlled very accurately, and, even so, it is not possible to ensure that the product is uniform. On the other hand, this technique entails substantial additional manipulation of the glove when it has been manufactured, which, in addition to the extra complication in the manufacturing process, may involve a reduction in the final quality of the product. Finally, it should be pointed out that this technique does not sufficiently increase sliding on the surface of the latex.

The most recent processes developed to solve the technical problems associated with adhesion and sliding of the gloves are based on treating the latex with various substances (such as polymers of the hydrogel type) which form a new surface film adhering to the latex itself. Patents U.S. Pat. No. 3,967,014, U.S. Pat. No. 4,482,577 and U.S. Pat. No. 4,575,476 describe some products which have been developed hitherto to coat the latex and prevent its adhesion, while at the same time increasing its sliding properties. Among the polymers of the hydrogel type there may be mentioned polyvinylpyrrolidones, polyhydroxyethyl acrylates, polyhydroxyethyl methacrylates, and copolymers thereof with acrylic or methacrylic acid, acrylic ester or methacrylic ester, and vinylpyridine. These new processes are not free of disadvantages. In patent U.S. Pat. No. 4,482,577, which protects coatings of the hydrogel type, it is indicated that the pretreatments of the rubber or latex, like those carried out in the halogenation process, may entail a deterioration in the physical properties of the product. However, in order to apply the hydrogel coating, the glove has to be treated with a concentrated solution of an acid, such as, for example, sulphuric acid, which, if not properly controlled, may reduce the quality of the end product. In addition, the treatment with acid and the later neutralization thereof entail additional operations and, therefore, a disadvantage, as already mentioned in the case of halogenation. On the other hand, as in the case of halogenation, it is advantageous to apply a surfactant in a further process step in order to improve sliding.

In view of the prior art, it is clear that the development of novel products and processes in order to prevent adhesion between latex films and to increase sliding in surgical gloves, without using lubricating powders, is a major problem in this industrial sector.

SUMMARY OF THE INVENTION

DESCRIPTION OF THE INVENTION

The present invention provides a novel composition for coating articles produced from rubber or latex which is based on polar polyethylenic waxes, polymers derived from dimethylsiloxane and surfactants, and which prevents adhesion between latex films and increases sliding on the surface of surgical gloves and other similar products without having to use pulverulent lubricating substances and, surprisingly, avoids the disadvantages exhibited by other products used for the same purpose. This invention is also surprising in view of patent U.S. Pat. No. 3,411,982 published in 1968, which also describes a process for obtaining gloves lubricated without powder, where it is stated that the waxes and silicones are poor coatings for latex because the interface between the rubber and these lubricants is rapidly degraded.

The present invention also relates to the use of this novel composition in the production of a rubber or latex article coated .with a lubricating film, in accordance with the following steps:

a) Immersion of a suitable mold in a coagulant solution.

b) Drying of the coagulant film formed.

c) Immersion of the mold in a dispersion of prevulcanized latex or rubber and formation of a rubber or latex film.

d) Partial drying of the rubber or latex film.

e) Washing of the rubber or latex film in hot water.

f) Immersion of the rubber or latex film, which is still in the mold, in an aqueous emulsion of polar polyethylenic waxes and dimethylsiloxane polymers. (Other technically feasible application processes are also valid.)

g) Drying of the layer of lubricant and drying and vulcanization of the latex film.

h) Removal of the glove from the mold (de-molding).

As can be seen from this scheme, the use of the composition to which the invention relates avoids prior treatment of the rubber or latex article with aggressive products, such as the halogenating agents or the sulphuric acid used when coating with hydrogels. On the other hand, the application of the composition in the manufacturing chain itself, prior to the vulcanization of the product, avoids operations once the glove has been completed. The simplicity of this process for manufacturing the rubber or latex product, which requires neither pretreatment of the product nor subsequent operations, is highly desirable because it prevents any loss of the physical properties required in the rubber or the latex.

The composition to which the present invention relates is formed preferably by 4.5%, although values between 1% and 10% are also acceptable, of polar polyethylenic waxes; 1%, which may also vary between 0.1% and 4%, of polymers derived from dimethylsiloxane; 2%, although values between 0.5% and 4% are also possible, of surfactants; and water.

The composition to which the invention relates is preferably obtained by mixing an approximately 24% aqueous emulsion of polar polyethylenic waxes having a molecular weight of between 3000 and 5000 and an acidity index of between 15 and 17 and a melting point higher than 125° C. (the high melting point gives the wax sufficient hardness to withstand the friction which it may be subjected to in use), and an aqueous emulsion having a concentration of approximately 40% of one or more polymers derived from dimethylsiloxane having a different molecular weight. The viscosity of this latter emulsion must be between 200 and 15000 centistokes. Finally, the composition is adjusted to the above-mentioned concentrations by the addition of water.

The above-mentioned emulsions are obtained by using as dispersants, suitable surfactants, preferably of cationic nature, such as oxyethylene oleic amines, oxyethylene stearic amines and/or oxyethylene coconut amines. The emulsion of polyethylenic waxes is obtained by using the surfactant in a proportion of approximately 40% based on the weight of the dry wax; whereas an amount of approximately 23% of the weight of the dry polymer is used in the emulsion of the polymers derived from dimethylsiloxane.

After combining the two emulsions and adding the necessary water, the composition to which the invention relates is ready for its application to the gelled latex film (water content from 30% to 70%), which has preferably been washed, by immersion or by any other technically feasible method, such as indicated in the process scheme.

Although not mentioned above, the rubber to which the composition forming the subject of the invention is applied may be natural or synthetic rubber, although it is preferable to use natural rubber in aqueous dispersion, that is to say, natural latex.

EXAMPLES

Example 1

A ceramic mold of suitable form was immersed in a coagulant solution, the solution was dried on the mold and the whole was immersed in a dispersion of prevulcanized natural latex having a concentration of rubber of 40%. The film of prevulcanized latex which had formed was then washed with hot water. A mixture of emulsion A, 18%, emulsion B, 0.9%, and water to make up to 100%, was subsequently applied by spraying.

Emulsion A

| 1. | Polar polyethylenic wax, having a molecular weight of 5000, an acidity index of 15 and a melting point of 142° C. | 26% |
| 2. | Oxyethylene oleic amine (2 moles) | 8% |
| 3. | Water | 66% |

Emulsion B

| 1. | Dimethylsiloxane polymer having a viscosity of 300 cSt | 19.0% |
| 2. | Dimethylsiloxane polymer having a viscosity of 1000 cSt | 11.0% |
| 3. | Dimethylsiloxane polymer having a viscosity of 12000 cSt | 11.0% |
| 4. | Oxyethylene stearic amine (8 moles) | 3.5% |
| 5. | Oxyethylene coconut amine (6 moles) | 6.0% |
| 6. | Water | 49.5% |

The latex film coated with the layer of lubricating mixture was then dried and vulcanized and the glove was removed from the mold.

In this case, the lubricating film formed exhibited a good quality but there was a slight difficulty in fitting the glove onto the user's hand.

Example 2

The procedure was as in Example 1 but the composition of the mixture was changed. In this case the mixture was formed by an emulsion A, 18%, an emulsion B, 1.8%, and water to make up to 100%. Likewise, the composition of the constituent emulsions was changed in order to improve the stability of the resulting mixture.

Emulsion A

| 1. | Polar polyethylenic wax, having a molecular weight of 5000, an acidity index of 15 and a melting point of 142° C. | 26% |
| 2. | Oxyethylene oleic amine (2 moles) | 8% |
| 3. | Oxyethylene nonylphenol (8 and 20 moles) | 2% |
| 4. | Water | 64% |

Emulsion B

| 1. | Dimethylsiloxane polymer having a viscosity of 300 cSt | 19.0% |
| 2. | Dimethylsiloxane polymer having a viscosity of 1000 cSt | 11.0% |
| 3. | Dimethylsiloxane polymer having a viscosity of 12000 cSt | 11.0% |
| 4. | Oxyethylene stearic amine (8 moles) | 3.5% |
| 5. | Oxyethylene coconut amine (6 moles) | 6.0% |
| 6. | Oxyethylene nonylphenol (20 moles) | 3.0% |
| 7. | Water | 46.5% |

The latex film coated with the layer of lubricating mixture was then dried and vulcanized and the glove was removed from the mold.

In this case, the lubricating film formed exhibited a poorer quality relative to the previous Example.

Example 3

The procedure was as in Example 2 but the composition of emulsions A and B was changed.

Emulsion A

| 1. | Polar polyethylenic wax, having a molecular weight of 5000, an acidity index of 15 and a melting point of 142° C. | 26% |
|---|---|---|
| 2. | Oxyethylene oleic amine (2 moles) | 8% |
| 3. | Water | 66% |

Emulsion B

| 1. | Dimethylsiloxane polymer having a viscosity of 300 cSt | 19.0% |
|---|---|---|
| 2. | Dimethylsiloxane polymer having a viscosity of 1000 cSt | 11.0% |
| 3. | Dimethylsiloxane polymer having a viscosity of 12000 cSt | 11.0% |
| 4. | Oxyethylene stearic amine (8 moles) | 3.5% |
| 5. | Oxyethylene coconut amine (6 moles) | 6.0% |
| 6. | Water | 49.5% |

The latex film coated with the layer of lubricating mixture was then dried and vulcanized and the glove was removed from the mold.

In this case the lubricating film exhibited a very good quality.

Example 4

The procedure was as in Example 3 but the application of the resulting mixture was carried out in a different manner. Instead of applying it by spraying, the mold with the washed latex film was immersed in the mixture formed by emulsion A (16%) and emulsion B (1.6%) of the previous Example.

The latex film coated with the layer of lubricating mixture was then dried and vulcanized and the glove was removed from the mold.

In this case, the lubricating film exhibited a very good quality equivalent to that of the previous Example.

We claim:

1. A coating composition for rubber or latex articles, comprising between 1% and 10% of at least one polar polyethylenic wax, between 0.1% and 4% of at least one polymer derived from dimethylsiloxane, between 0.5% and 4% of at least one surfactant, and water, wherein said at least one surfactant is selected from oxyethylene oleic amines, oxyethylene stearic amines, oxyethylene coconut amines, or any combination thereof.

2. A coating composition for rubber or latex articles, comprising between 1% and 10% of at least one polar polyethylenic wax, between 0.1% and 4% of at least one polymer derived from dimethylsiloxane, between 0.5% and 4% of at least one surfactant, and water, wherein said at least one polar polyethylenic wax is a first aqueous emulsion having a molecular weight of between 3000 and 5000, an acidity index of between 15 and 17, and a melting point higher than 125° C., and further wherein said at least one polymer derived from dimethylsiloxane is a second aqueous emulsion having a viscosity of between 200 and 15,000 centistokes, said emulsions each including said at least one surfactant.

3. A coating composition for rubber or latex articles, comprising between 1% and 10% of at least one polar polyethylenic wax, between 0.1% and 4% of at least one polymer derived from dimethylsiloxane, between 0.5% and 4% of at least one surfactant, and water, wherein said at least one polar polyethylenic wax is present in a concentration of 4.5%, said at least one polymer derived from dimethylsiloxane is present in a concentration of 1%, and said at least one surfactant is present in a concentration of 2%, and wherein said at least one surfactant is selected from oxyethylene oleic amines, oxyethylene stearic amines, oxyethylene coconut amines, or any combination thereof.

4. A coating composition for rubber or latex articles, comprising between 1% and 10% of at least one polar polyethylenic wax, between 0.1% and 4% of at least one polymer derived from dimethylsiloxane, between 0.5% and 4% of at least one surfactant, and water, wherein said at least one polar polyethylenic wax is present in a concentration of 4.5%, said at least one polymer derived from dimethylsiloxane is present in a concentration of 1%, and said at least one surfactant is present in a concentration of 2%, and wherein said at least one polar polyethylenic wax is a first aqueous emulsion having a molecular weight of between 3000 and 5000, an acidity index of between 15 and 17, and a melting point higher than 125° C., and further wherein said at least one polymer derived from dimethylsiloxane is a second aqueous emulsion having a viscosity of between 200 and 15,000 centistokes, said emulsions each including said at least one surfactant.

5. A coating composition according to claim 1, wherein said at least one polar polyethylenic wax is a first aqueous emulsion having a molecular weight of between 3000 and 5000, an acidity index of between 15 and 17, and a melting point higher than 125° C., and further wherein said at least one polymer derived from dimethylsiloxane is a second aqueous emulsion having a viscosity of between 200 and 15,000 centistokes, said emulsions each including said at least one surfactant.

6. A coating composition for rubber or latex articles, comprising between 1% and 10% of at least one polar polyethylenic wax, between 0.1% and 4% of at least one polymer derived from dimethylsiloxane, between 0.5% and 4% of at least one surfactant, and water, wherein said article is a surgical glove.

7. A coating composition for a rubber or latex article, consisting essentially of between 1% and 10% of at least one polar polyethylenic wax, between 0.1% and 4% of at least one polymer derived from dimethylsiloxane, between 0.5% and 4% of at least one surfactant, and water.

8. A coating composition according to claim 7, wherein said at least one polar polyethylenic wax is present in a concentration of 4.5%, said at least one polymer derived from dimethylsiloxane is present in a concentration of 1%, and said at least one surfactant is present in a concentration of 2%.

9. A coating composition according to claim 7, wherein said at least one surfactant is selected from oxyethylene oleic amines, oxyethylene stearic amines, oxyethylene coconut amines, or any combination thereof.

10. A coating composition according to claim 7, wherein said at least one polar polyethylenic wax is a first aqueous emulsion having a molecular weight of between 3000 and 5000, an acidity index of between 15 and 17, and a melting point higher than 125° C., and further wherein said at least one polymer derived from dimethylsiloxane is a second aqueous emulsion having a viscosity of between 200 and 15,000 centistokes, said emulsions each including said at least one surfactant.

11. A method of lubricating a rubber or latex article, said method comprising the step of applying a coating composition to the rubber or latex article, the coating composition comprising between 1% and 10% of at least one polar polyethylenic wax, between 0.1% and 4% of at least one polymer derived from dimethylsiloxane, between 0.5% and 4% of at least one surfactant, and water, wherein the rubber or latex article is in an unvulcanized state during said applying step, and wherein the at least one polar polyethylenic wax is a first aqueous emulsion having a molecular weight of between 3000 and 5000, an acidity index of between 15 and 17, and a melting point higher than 125° C., and further wherein the at least one polymer derived from dimethylsiloxane is a second aqueous emulsion having a viscosity of between 200 and 15,000 centistokes, the emulsions each including the at least one surfactant.

12. A method according to claim 11, wherein the at least one surfactant is selected from oxyethylene oleic amines, oxyethylene stearic amines, oxyethylene coconut amines, or any combination thereof.

\* \* \* \* \*